3,098,796
16-HYDROXYLATION OF STEROIDS
Allen I. Laskin, Somerset, N.J., assignor to Olin Mathieson Chemical Corporation, New York, N.Y., a corporation of Virginia
No Drawing. Filed Oct. 19, 1961, Ser. No. 146,346
6 Claims. (Cl. 195—51)

This invention relates to, and has for its object the provision of, a method for producing 16-hydroxylated steroids, and more particularly to a microbial process for converting a 16-unsubstituted steroid to its 16-hydroxy derivative.

It has been found that steroids having a methylene group in the 16-position, especially 3-keto or 3-hydroxy steroids, or protected derivatives thereof, either of the androstane (including etiocholane and androstene) series or pregnane (including allopregnane, pregnene and pregnadiene) series, the 3,20-diketo steroids of the pregnane series being particularly preferred, can be converted into useful 16α-hydroxy derivatives by subjecting them to the action of enzymes of Streptomyces californicus, Streptomyces coelicolor, or Streptomyces vinaceus or to the action of the organisms themselves, under oxidizing and preferably aerobic conditions.

Among the steroids which may be oxygenated by the practice of this invention are those steroids unsubstituted in the 16-position, which are members of: the androstane series, which series includes the androstene and etiocholane series; the estrane series, which series includes the estratriene series; and the pregnane series, which series includes the allopregnane, pregnene and pregnadiene series. Of these, the steroids of the pregnane series, and more particularly the 3,20-diketo steroids of the pregnane series are preferred. Examples of suitable steroids of the pregnane series include progesterone; pregnenolone; pregnanolone; 9β,11β-oxido progesterone; 9β,11β-oxidodesoxy corticosterone; 11β,12β-oxidoprogesterone; 11β,12β-oxidodesoxy corticosterone; hydroxylated progesterones, such as 2α,6α,6β,7,8,9,11α,11β,12α,14,15α, and 15β-hydroxyprogesterone; halogenated progesterone, such as 21-chloroprogesterone; aldosterone; corticosterone; 11-desoxycorticosterone; 17α-hydroxy-11-desoxycorticosterone (Reichstein's compound S); hydrocortisone; prednisolone; 9α-halohydrocortisones (e.g., 9α-fluorohydrocortisone); 9α-halo-prednisolones (e.g., 9α-fluoroprednisolone); 6,9α-dihalohydrocortisones (e.g., 6α,9α-difluorohydrocortisone); and 6,9α-dihaloprednisolones (e.g., 6α,9α-difluoroprednisolone). As indicated before, however, although the preferred starting materials are steroids of the pregnane series, the process of this invention is a general one which may be employed to 16α-hydroxylate other classes of steroids such as those of the androstane series, as exemplified by Δ⁴-androstene-3,17-dione and testosterone; and those of the estrane series, as exemplified by estrone and estradiol.

Among the steroids formed by the process of this invention are the 16α-hydroxy derivatives of the pregnane series, preferably the 16α-hydroxy-3,20-diketo-steroids of the pregnane series. Examples of resulting products of the 16α-hydroxy pregnane series include 16α-hydroxy-progesterone; the 16α-hydroxy derivatives of hydroxylated progesterone; the 16α-hydroxy derivatives of halogenated progesterone; 16α-hydroxyaldosterone; 16α-hydroxycorticosterone; 16α-hydroxy-11-desoxycorticosterone; 16α,17α-dihydroxy-11-desoxycorticosterone; 16α-hydroxyhydrocortisone; 16α-hydroxyprednisolone; 9α-halo-16α-hydroxyhydrocortisones (e.g., 9α-fluoro-16α-hydroxyhydrocortisone); 9α-halo-16α-hydroxyprednisolones (e.g., triamcinolone); 6,9α-dihalo-16α-hydroxyhydrocortisones (e.g., 6α,9α-difluoro-16α-hydroxyhydrocortisone); and 6,9α-dihalo-16α-hydroxyprednisolones (e.g., 6α,9α-difluoro-16α-hydroxyprednisolone). If a steroid of the androstane series is hydroxylated, the 16α-hydroxy derivative is also formed as exemplified by 16α-hydroxy-Δ⁴-androstene-3,17-dione and 16α-hydroxytestosterone. If a steroid of the estrane series is hydroxylated, the 16α-hydroxy derivative is also formed as exemplified by 16α-hydroxyestrone and 16α-hydroxy estriol.

The action of the enzymes of Streptomyces californicus, Streptomyces coelicolor, or Streptomyces vinaceus to produce 16α-hydroxy steroids can be utilized either by including the steroid in an aerobic culture of the microorganism, or by bringing together, in an aqueous medium, the steroid, air, and enzymes of non-proliferating cells of the microorganism.

In general, the conditions of culturing the Streptomyces for the purposes of this invention are (except for the inclusion of the steroid to be converted) the same as those of culturing various Streptomyces for the production of antibiotics and/or vitamin $B_{12}$, i.e., the microorganism is aerobically grown in contact with (in or on) a suitable fermentation medium. A suitable medium essentially comprises a source of nitrogenous and growth-promoting factors, and an assimilable source of carbon and energy. The latter may be a carbohydrate and/or the steroid itself. Preferably, however, the medium includes an assimilable source of carbon and energy in addition to the steroid.

The nitrogen source materials may be organic (e.g. soybean meal, cornsteep liquor, meat extract and/or distillers solubles) or synthetic (i.e., composed of simple, synthesizable organic or inorganic compounds such as ammonium salts, alkali nitrates, amino acids, urea or thiourea).

As to the source material, lipids, especially (1) fatty acids having at least 14 carbon atoms, (2) fats or (3) mixtures thereof, may be used. Examples of such fats are lard oil, soybean oil, linseed oil, cottonseed oil, peanut oil, fancy mutton tallow, sperm oil, olive oil, tristearin, tripalmitin, triolein and trilaurein, and illustrative fatty acids include stearic, palmitic, oleic, linoleic and myristic acids.

Other carbon-containing materials may also be used. For example, such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The following examples are illustrative of the invention:

EXAMPLE 1

*(a) Fermentation*

Surface growth from each of five two-week old agar slant cultures of Streptomyces californicus, WC 3312 (Culture Collection, Institute of Microbiology, Rutgers University, New Brunswick, New Jersey), the slant containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 2.5 ml. of a 0.01% sodium lauryl sulphate aqueous solution. One ml. portions of the suspension are used to inoculate ten 250 ml. conical flasks, each containing 50 ml. of the following sterilized medium (B):

| | Grams |
|---|---|
| Glucose | 30 |
| Soybean meal | 20 |
| Soybean oil | 2.2 |
| CaCO$_3$ | 2.5 |

Distilled water to 1 liter.

After 72 hours' incubation at 25° C. with continuous rotary agitation (280 cycles per minute; 2 inch radius), 10% (vol./vol.) transfers are made to 67 250 ml. conical flasks each containing 50 ml. of fresh sterilized medium B plus 300 micrograms/ml. of progesterone. The steroid is added by supplementing each flask with 0.25 ml. of a sterile solution of the steroid in N,N-dimethylformamide containing 60 mg./ml. of steroid. After 48 hours of further incubation, the contents of the flasks are pooled and filtered through a Seitz clarifying pad. The flasks, mycelium and pads are washed with successive 50 ml. portions of warm water.

(b) *Isolation of 16α-Hydroxyprogesterone*

The combined filtrate and washings are extracted with chloroform. The chloroform extracts are then washed with water and evaporated to dryness in vacuo. The resulting crude product is crystallized from acetone-hexane to give 16α-hydroxyprogesterone.

*Example 2*

Following the procedure of Example 1, but substituting a culture of *Streptomyces coelicolor*, WC 3593, for the *Streptomyces californicus* in part *a*, 16α-hydroxyprogesterone is isolated.

*Example 3*

Following the procedure of Example 1, but substituting a culture of *Streptomyces vinaceus*, ATCC 11861 (American Type Culture Collection, Washington, D.C.), for the *Streptomyces californicus* in part *a*, 16α-hydroxyprogesterone is isolated.

*Example 4*

Following the procedure of Example 1, but substituting an equivalent amount of Reichstein's compound S acetate for the progesterone, 16α-hydroxy compound S is obtained.

*Example 5*

Following the procedure of Example 1, but substituting an equivalent amount of desoxycorticosterone acetate for the progesterone, 16α-hydroxy-desoxycorticosterone is obtained.

Similarly, *S. coelicolor* WC 3593 and *S. vinaceus* ATCC 11861 convert desoxycorticosterone acetate to 16α-hydroxy-desoxycorticosterone.

*Example 6*

Following the procedure of Example 1, but substituting an equivalent amount of androstenedione for the progesterone, 16α-hydroxy-Δ$^4$-androstene-3,17-dione is obtained.

*Example 7*

Following the procedure of Example 1, but substituting an equivalent amount of prednisolone for the progesterone, 16α-prednisolone is obtained.

*Example 8*

Following the procedure of Example 1, but substituting an equivalent amount of 9α-fluoroprednisolone for the progesterone, triamcinolone is obtained.

*Example 9*

Following the procedure of Example 1, but substituting an equivalent amount of 9α-fluorohydrocortisone for the progesterone, 9α-fluoro-16α-hydroxyhydrocortisone is obtained.

*Example 10*

Following the procedure of Example 1, but substituting an equivalent amount of estrone for the progesterone, 16α-hydroxyestrone is obtained.

Similarly, any other 16-unsubstituted steroid of the pregnane, androstane or estrane series can be converted by *Streptomyces californicus*, *Streptomyces coelicolor* or *Streptomyces vinaceus* to its 16α-hydroxy derivative.

This invention may be variously otherwise embodied within the scope of the appended claims.

What is claimed is:

1. The method of converting a steroid into a 16α-hydroxy derivative thereof, which comprises subjecting a steroid selected from the group consisting of a steroid of the pregnane series, a steroid of the androstane series and a steroid of the estrane series to the action of enzymes of a microorganism of the class consisting of *Streptomyces californicus*, *Streptomyces coelicolor* and *Streptomyces vinaceus*, under oxidizing conditions, and recovering the 16α-hydroxy steroid formed.

2. The method of claim 1 wherein the steroid is of the pregnane series.

3. The method of claim 1 wherein the steroid is of the androstane series.

4. The method of claim 1 wherein the steroid is of the estrane series.

5. The method of claim 1 wherein the steroid is a 3-ketosteroid.

6. The method of claim 1 wherein the steroid is progesterone.

References Cited in the file of this patent

UNITED STATES PATENTS 2,855,343    Fried et al.    Oct. 7, 1958